March 22, 1966  J. H. NEWITT  3,241,368
APPARATUS AND METHOD FOR MEASURING THE LEVEL OF A LIQUID
Filed Aug. 2, 1963  2 Sheets-Sheet 1
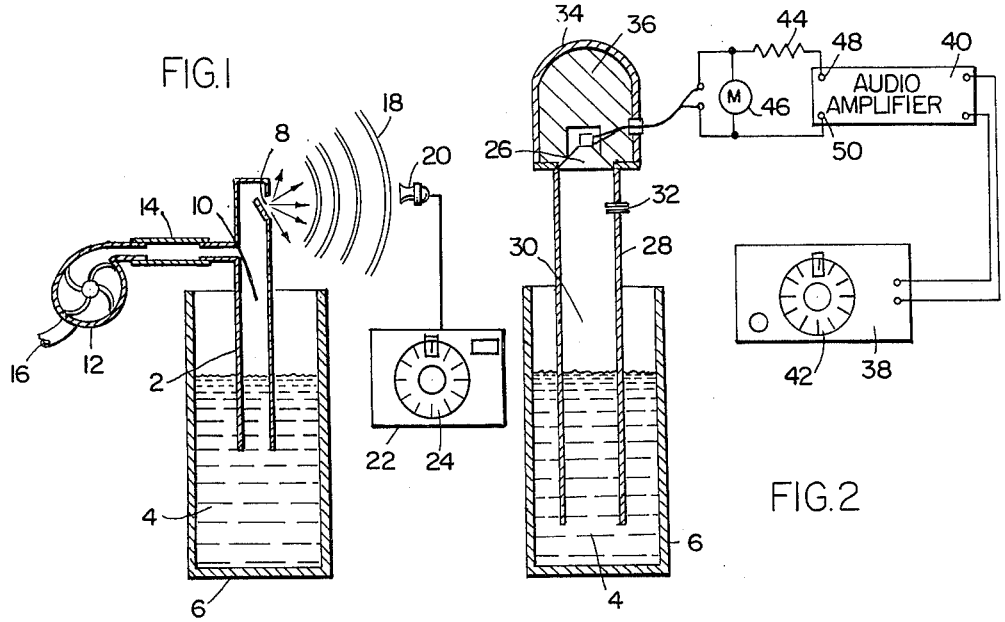
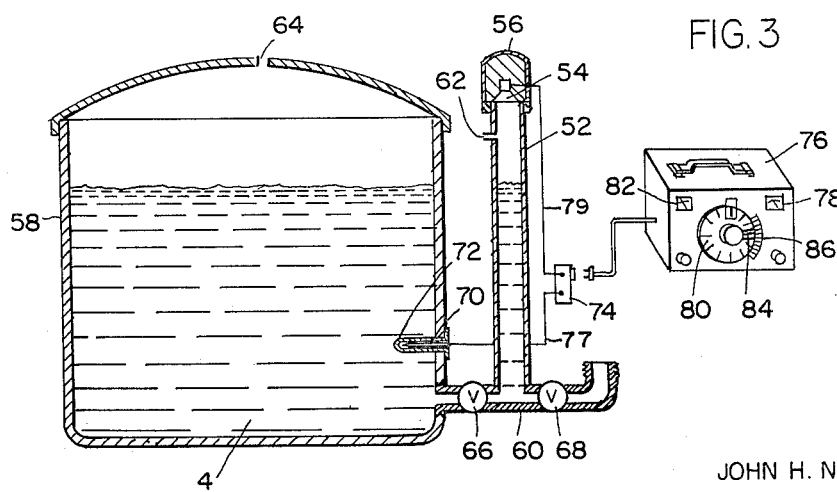
INVENTOR.
JOHN H. NEWITT
BY
Russell, Chittick, & Pfund
ATTORNEYS March 22, 1966 J. H. NEWITT 3,241,368
APPARATUS AND METHOD FOR MEASURING THE LEVEL OF A LIQUID
Filed Aug. 2, 1963 2 Sheets-Sheet 2

INVENTOR.
JOHN H. NEWITT
BY
*Russell, Chittick, & Pfund*
ATTORNEYS

United States Patent Office 3,241,368
Patented Mar. 22, 1966

3,241,368
APPARATUS AND METHOD FOR MEASURING THE LEVEL OF A LIQUID
John H. Newitt, 58 Hollett St., North Scituate, Mass.
Filed Aug. 2, 1963, Ser. No. 299,526
18 Claims. (Cl. 73—290)

The present invention relates to a method and apparatus for measuring the level of a liquid in a container, and more particularly to a method and apparatus for measuring the acoustical resonance of a cavity directly above the liquid to determine the level of the liquid in the container.

In the storage of liquids and bulk materials it is often necessary to measure the level of the liquid or material in a tank and to determine therefrom the actual contents of the tank after making an appropriate compensation for the temperature of the liquid or material. Various methods and systems have been devised to measure liquid levels including those which are classified as "direct measurement" systems because they directly measure the liquid itself. The direct measurement systems usually employ a sensing or transducer element immersed in the liquid, however, from a measuring standpoint such systems are inherently complicated because they require difficult and sophisticated compensation for the many variables which affect the transducer element. Depending upon the type of transducer employed in the system, variables such as liquid temperature, viscosity, dielectric constant, specific gravity, etc., must be taken into account to provide an accurate reading of the liquid contents of the tank.

Many of the problems associated with direct liquid measuring, immersed transducer systems can be avoided by removing the transducer from the liquid and using the transducer to indirectly measure liquid level by directly measuring some other quantity which varies in accordance with changes in the liquid level. Accordingly, it is a primary object of the present invention to measure an air space above the surface of the liquid to determine the level of the liquid in the tank.

In the accomplishment of this object, I measure the air space above the surface of the liquid by probing an acoustic cavity positioned directly above the liquid with low frequency sound energy. The acoustic cavity is in fluid communication with the liquid in the tank so that the liquid level in the tank and cavity will be equal at all times. The frequency of the applied sound energy is varied until the cavity resonates at its fundamental frequency or a harmonic thereof. The reasonant frequency of the cavity can then be determined and since the resonant frequency is a direct measure of the size of the cavity, it is a relatively simple matter to interpret the resonant frequency in terms of liquid level or liquid content.

Since the indirect measurement of liquid level circumvents many of the difficulties encountered in attempting a direct measurement of the liquid itself, my measuring system can utilize a simple, uncritical, and inexpensive instrument thereby substantially decreasing the cost of manufacture compared to direct measuring devices doing a similar job. It is a feature of my measuring system that liquid levels can be accurately measured without requiring the use of expensive, laboratory quality instruments.

It is another feature of my system that the electrical parts of the sensor or transducer element are not immersed in the liquid which is being measured. This in itself is a great advantage particularly in regard to initial installaton costs and routine maintenance expenses and especially in relation to applications involving corrosive, volatile, or explosive environments or in conditions which tend to build up deposits on any immersed object.

Other features and objects of my liquid level measuring system will be apparent after reading the following detailed description in conjunction with the drawings, in which:

FIG. 1 is a view in partial section illustrating the principle of operation of the invention and showing one embodiment thereof;

FIG. 2 is a view in partial section showing another embodiment of the invention;

FIG. 3 is a view in partial section of an embodiment of the invention adapted for use with multiple liquid storage tanks.

Figure 4:
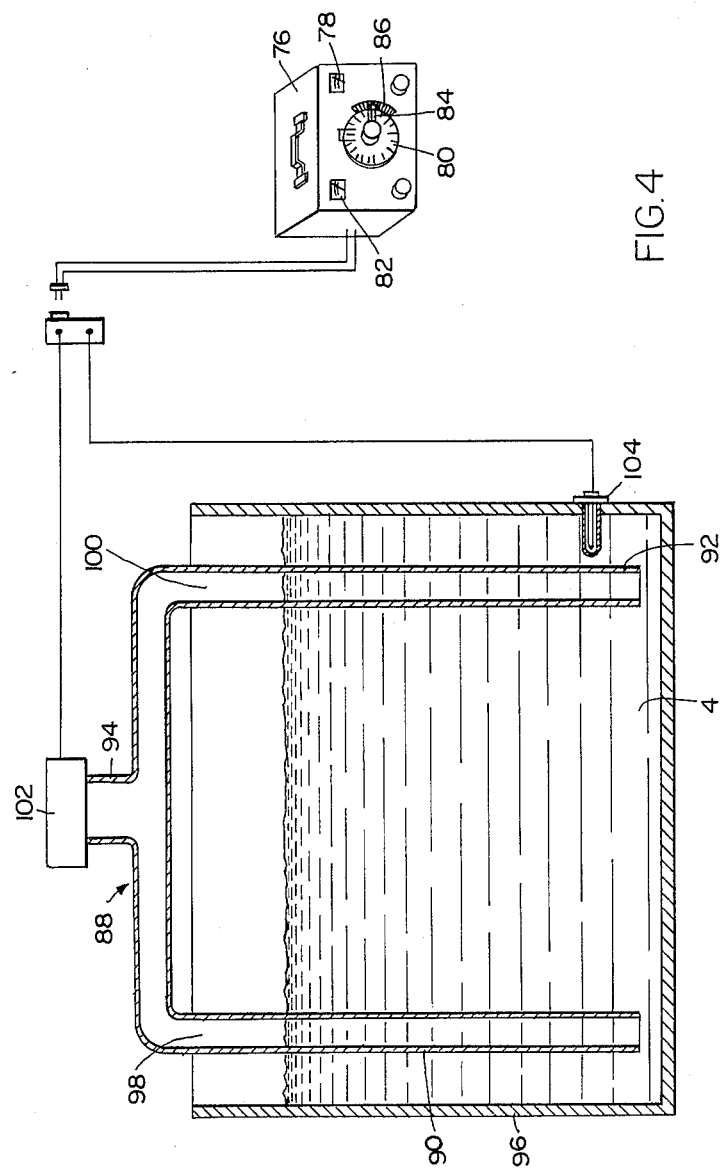
FIG. 4 is a view in partial section of an embodiment of the invention adapted for use with shipboard tank installations.

Turning now to the drawings, the principle of operation of my measuring system is illustrated in FIG. 1. An acoustical tube or pipe 2 is inserted in a liquid 4 contained in a tank 6 or similar storage vessel. The liquid 4 encloses one end of tube 2 while the other end of the tube remains open or, as shown in FIG. 1, is fitted with an organ pipe or whistle outlet 8. The whistle outlet 8 constitutes a special type of opening and conceptually is the equivalent of an open-ended tube. The air space within tube 2 directly above the surface of the liquid 4 forms an acoustic cavity 10 which will resonate at a fundamental frequency determined by the size of the cavity 10 and at harmonics at the fundamental frequency. The tube 2 is in fluid communication with the liquid 4 in tank 6 so that the liquid level in tank 6 and tube 2 will be equal at all times. As the liquid level in tank 6 and tube 2 changes, the resonant frequency of the acoustic cavity 10 also changes because the size of the acoustic cavity 10 varies in accordance with changes in the liquid level. The resonant frequency of the acoustic cavity 10 can then be determined and interpreted in terms of liquid level because the resonant frequency and the liquid level are interdependent.

Referring now to the specific embodiment shown in FIG. 1, the acoustic cavity 10 is resonated by an air pump 12 connected to tube 2 through a flexible coupling 14. When the air pump 12 is started, air is drawn into the pump through an inlet 16, compressed and then forced into the acoustic cavity 10 where it escapes through whistle opening 8. With the proper air pressure, cavity 10 will radiate a sound wave 18 at the natural resonant frequency of the cavity 10. The sound wave 18 is detected by a microphone 20 which converts the varying acoustic pressure into an electrical signal which varies in accordance with the applied sound pressure. The electrical signal is coupled to a frequency measuring device 22 which has a dial 24 calibrated in terms of liquid level. For a number of practical reasons, this system is not especially desirable although it will work and can even be read remotely by pointing a parabolic microphone (not shown) with highly directive characteristics at the opening 8 in tube 2.

If it is important to reduce the effects of ambient sonic noise or to obtain a tight or sealed installation, the embodiment shown in FIG. 2 will be found to be preferable for many practical engineering reasons. In this embodiment, a loudspeaker 26 is placed over the upper end of a tube 28 which is immersed in the liquid 4 in a similar manner to that shown in FIG. 1. Conceptually, the acoustic cavity 30 formed above the surfaces of liquid 4 within tube 28 is exactly the same as acoustic cavity 10 and the principle of operation described above is equally applicable to the embodiment shown in FIG. 2. The tube 28 is provided with an air-bleed hole 32 positioned above the maximum anticipated liquid level within tube 28. The air-bleed hole 32 acts as a pressure relief valve to equalize changes in pressure within tube 28 during changes in liquid level.

The loudspeaker 26 is mounted coaxially within the upper end of tube 28 so that the loudspeaker diaphragm (not shown) is parallel to the surface of liquid 4. The entire rear portion of loudspeaker 26 is sealed within enclosure 34 to capture the back wave from the loudspeaker. A sound-absorbing material 36 substantially fills enclosure 34 to minimize resonance effects. Although the sealed loudspeaker enclosure and sound dampening material significantly improve the performance of the measuring system under adverse measuring conditions, it should be understood that it is within the spirit of the invention to merely position the loudspeaker 26 at the open end of tube 28 without attempting to acoustically seal either the rear portion of the loudspeaker or the tube and loudspeaker.

The loudspeaker 26 is driven by a variable frequency audio oscillator 38 through an audio amplifier 40. The dial 42 of the audio frequency oscillator 38 is calibrated to read in terms of liquid level rather than audio frequency. When the oscillator 38 is adjusted to resonate with the acoustic cavity 30, the loudspeaker 26 will experience a sharp change in acoustical loading which can be readily detected electrically by conventional devices. Perhaps one of the simplest methods to indicate the acoustical loading on loudspeaker 26 is shown in FIG. 2. A series resistance 44 is placed between the loudspeaker 26 and the driving amplifier 40 and a voltmeter 46 is connected across the voice coil (not shown) of loudspeaker 26. When the resonant point of acoustic cavity 30 is encountered in tuning the audio oscillator 38 through its range, the acoustical loading on loudspeaker 26 will alter the current flow through the loudspeaker voice coil producing a concomitant change in the IR drop across the voice coil. The change in voltage across the voice coil can be seen on voltmeter 46. When the voltmeter 46 indicates the resonance of cavity 30, the liquid level can be determined by reading the dial setting of oscillator 38 which is calibrated directly in terms of liquid level. A sensitive current meter in series with the loudspeaker voice coil can also be used to detect resonance by indicating the change in voice coil current produced by the acoustical loading of loudspeaker 26.

It is obvious that other methods may also be employed to detect the acoustical loading on loudspeaker 26. For example, a far more sensitive electrical reading can be obtained by measuring the phase shift that takes place between any two of the following: the loudspeaker voice coil, the series resistor 44, and the amplifier output terminals 48 and 50 when the oscillator 38 is adjusted to resonate the acoustic cavity 30.

It is important to note that it is the combination of the acoustic tube 28, the loudspeaker 26, and the series resistance 44 which comprises the transducer in the embodiment shown in FIG. 2. The loudspeaker 26 and its electrical and acoustical characteristics are relatively uncritical in this combination and hence, almost any inexpensive loudspeaker can be used in the transducer. The sharpness and intensity of the observed resonance is determined almost solely by the acoustical cavity 30 with the loudspeaker 26 acting mostly as a highly damped follower device. With relatively small pipes of only a few inches in diameter, the cavity Q (electrically speaking) will be quite high and will produce a very pronounced resonance effect with inexpensive common elements shown in FIG. 2. Since the loudspeaker 26 is heavily damped i.e., low Q, it will contribute little, if any, effect to the observed resonance indication, even when driven near or around its natural resonant frequency. As a result, with the embodiment shown in FIG. 2, it is easily possible to measure liquid levels to an accuracy of $\frac{1}{10}$ of an inch using an ordinary "high-fi" amplifier that has a reasonably flat response curve from 20–20,000 c.p.s. and a serviceman's type audio oscillator.

If a more precise measurement is required, it can be obtained by combining the very sensitive phase measurement approach, previously described, with the use of increased stability in the amplifier and oscillator circuitry. However, since the acoustic cavity 30 is the basic determinant of the resonant characteristic and consequently of the inherent and ultimate resolution and accuracy of the device, the electronics need only be as stable as the accuracy of the measurement desired. For example, to measure levels to $\frac{1}{10}$ of an inch, no special care is needed in the design of the oscillator 38 and amplifier 40. Since very few liquid level bulk installations require more accuracy than this, an extremely inexpensive device can be obtained by using a standard audio oscillator, audio amplifier and an inexpensive loudspeaker. The acoustic cavity, which is the basic reference, will lend itself to far more precise measurements than are needed for most applications and thus only when unusual precision is required is it necessary to give special attention to the stability of the electronics.

Another important advantage of the acoustic liquid level measuring system accrues from the use of the acoustic cavity 30 as the basic reference. The acoustic cavity 30 is actually a "long" measuring stick compared to most transducers which move only a small fraction of an inch over their entire measuring range. Such transducers, in effect, constitute a "short" measuring stick. To design, calibrate and temperature compensate a "short stick" measuring device with a minute movement normally involves many critical factors which necessitate a considerable expense to achieve reasonable precision in production quantities. The advantages of a large measuring stick, in the form of a relatively long acoustic tube or pipe can now be realized. Since the acoustic tube 28 actually represents a one-to-one measurement ratio, the present invention eliminates the need for a precision-mechanism transducer-element design from both the mechanical and electrical standpoints. Although the loudspeaker 26 has a small movement, this movement is relatively unimportant because it is an "indicating" movement rather than a measuring movement. In fact, the response characteristic of the loudspeaker 26 does not even have to be linear to properly perform its job; since it merely indicates a condition of resonance. The problem of temperature correction is also greatly simplified in the present invention because the relatively large size of the transducer contributes relatively little to the calibration error due to its low measuring ratio as mentioned above.

In the operation of the embodiment described in FIG. 2, the operator simply tunes the audio oscillator 38 through its tuning range until a sharp deflection is noted on the indicating meter 46. Since the oscillator dial 42 is calibrated to read directly in terms of liquid level, the operator only has to read the setting of the instrument dial 42 when he sees a deflection in meter 46 in order to obtain a liquid level reading.

Various automatic schemes suggest themselves for accomplishing the read-out action remotely or automatically for alarm control, or automatic recording purposes. For instance, a servo motor can tune the oscillator 38 through its tuning range and the error signal developed around the resonance point can be employed to lock the servo motor with a consequent production of a position output indication of the liquid level. Electronic means of RC tuning the oscillator 38 to accomplish the same ends without mechanical movement can also be devised as can the control and alarm equipment which might operate from such a device.

If a null output is desired instead of a maximum deflection indication, the electrical indicator circuit can be changed to any one of many well-known designs. For example, if the phase difference between the loudspeaker voice coil and the series resistor 44 is fed to a bridge balancing circuit or a discriminator, null indication can be obtained at resonance when the resistive component of the voice coil current is in phase with that of the series resistor. This can be observed on a visual type of null detector such as could be obtained by applying a phase difference to the deflection plates of an oscilloscope. Alternatively, the phase signal can be used to actuate a relay for other control purposes. Since the inphase effect occurs only at resonance, a null from the two output sources can be obtained with the correctly phased connections and amplitude balancing arrangements. This and similar schemes would be obvious to one skilled in the art and constitute a natural extension of the basic invention.

Although there are various method and means for measuring the resonance of the acoustic cavities 10 and 30, I have shown by way of illustration in FIGS. 1 and 2 only two embodiments because once the combination of acoustic resonance and its electrical transduction as a means for measuring liquid level has been demonstrated, it is obvious that many alternatives regarding measurement detail will become evident to those skilled in the art.

The response from harmonics of the fundamental resonant frequency is a problem that is encountered in the fabrication of either of the embodiments shown in FIGS. 1 and 2. The harmonics are obtained whenever the acoustic cavity is resonated at a harmonic frequency of the natural fundamental resonant frequency of the cavity. However, since the amplitude of the higher order indications are distinct from the indications produced by the fundamental resonance, amplitude discriminators such as a biased diode can be employed to eliminate unwanted responses or to tell the operator which indications to ignore and which to read.

In some applications it is desirable to put the harmonic effect to useful ends. This is especially true in the case of measuring pipe lengths of 20 feet or more where the fundamental frequency involved is quite low. Although the amplitude of the resonant effect decreases at the higher order harmonics, the oscillator dial resolution i.e., sharpness of resonance, is much better than for the lower resonant frequencies. Thus the operator can make a rough determination of liquid level at the fundamental frequency and then switch the audio oscillator to a known harmonic frequency and dial scale range to obtain a more convenient and precise measurement of liquid level. With long pipe lengths, the fundamental frequency might best be employed only to provide a rough measurement of liquid level. The expense of very low frequency circuitry required for a precise reading can thus be avoided in this manner without sacrificing the ultimate accuracy of the measuring instrument. The technique of harmonic measurement thus provides an increase in precision for a given quality and cost of instrument.

The embodiment shown in FIG. 2 is suitable for use on tank farms and other multiple liquid storage installations where it is desirable to read the liquid levels in a number of tanks. Since the cost of the loudspeaker 26, speaker enclosure 34 and tube 28 is relatively low, it is economically feasible to install these elements permanently at each tank position as shown in FIG. 3. The tube 52, loudspeaker 54 and enclosure 56 are the same components that are employed in the embodiment shown in FIG. 2. Tube 52 is connected to a storage tank 58 through a filler pipe 60 so that the liquid levels in the tank 58 and tube 52 will be equal at all times. An air-bleed hole 62 acts as a pressure relief valve to equalize the air pressure within tube 52 during changes in liquid level. A similar pressure relief hole 64 is provided for storage tank 58. Two check valves 66 and 68 are mounted in filler pipe 60 to facilitate the filling and draining of tank 58 and tube 52, respectively.

A thermistor bulb 72 extends through the wall of tank 58 into the liquid 4. The thermistor bulb 70 provides an electrical output which represents the temperature of liquid 4. The thermistor electrical reading is used in conjunction with the electrical resonance liquid level reading to compute tank contents. The temperature compensated liquid-level reading provides a measure of actual tank contents.

The outputs from the thermistor 70 and loudspeaker 54 are fed to a junction box 74 through cables 77 and 79, respectively. The junction box 74, as shown in FIG. 3, has been separated from tube 52 for purposes of clarity, although it might normally be mounted on or near the bottom tube 52 so that it is readily accessible to the operator.

The operator can determine the liquid level or actual content of each tank simply by connecting his portable instrument 76 to the junction 74 provided at each installation. The portable instrument 76 contains the audio oscillator, amplifier and resonance indicator described with regard to the embodiment shown in FIG. 2. The sequence of operations is exactly the same in both embodiments. The oscillator is tuned until resonance is observed on meter 78 at which point the liquid level is read directly from dial 80 which is calibrated in terms of liquid level.

Since the readout is by a dial setting, it is obvious that temperature compensation can be inexpensively accomplished in all of the embodiments "slipping" the readout dial value in relation to the measured temperature. The temperature compensation can therefore be performed completely external of the transducer thus reducing complication in design and manufacture of the liquid level measuring instrument. The thermistor bulb output is read on meter 82 located on the portable instrument 76. The information derived from temperature indicating meter 82 can be used to set a movable cursor 84 on the liquid level readout dial 80. This can be accomplished by moving the cursor along a calibrated temperature scale 86. By providing a movable cursor 84 and calibrated cursor temperature scale 86 on the liquid level readout dial 80, the dial reading can be effectively "slipped" by an amount indicated by the temperature meter 82. The effect of variations in temperature on the transducer or liquid tank contents can thus be compensated or computed into the final reading obtained from the liquid level measuring instrument.

The temperature measurement of the liquid can also be employed to obtain a temperature compensated direct reading of tank contents. Assuming that the tank has a standard geometrical shape e.g., cylindrical or spherical, it is a relatively simple matter to determine the mathematical relationship between liquid level and tank contents. This relationship can be converted into dial markings on the audio oscillator to provide a direct, but non-temperature compensated reading of tank contents. Temperature compensation of the tank contents reading can then be achieved by utilizing the cursor 84 and temperature scale 86 to "slip" the dial reading in the same manner as described above.

The direct reading tank content dial calibration is not limited to "standard" tank shapes because an arbitrary calibration can be made on the instrument dial regardless of the shape of the tank. Admittedly, such a calibration may result in a non-linear scale, but this is basically immaterial. Normally, each dial must be individually calibrated for a particular tank to obtain the accuracy which is inherently possible with the liquid level measuring apparatus. However, if a number of substantially identical tanks are to be measured, as in the case of an oil tank farm, a single dial calibrated according to the proper volume formula can be employed to obtain readings of tank contents with a workable degree of accuracy. If the owner of the tank farm wanted to measure a set of tanks with different form factors, using a single instrument scale, an appropriate non-linear cursor can be switched in to obtain a direct reading of tank contents in conjunction with liquid temperature compensation.

Temperature variations of the liquid being measured constitute only one of the variables which should be taken into account to obtain an accurate reading of either liquid level or tank content. The temperature of the transducer air column i.e., the acoustic fluid, affects the resonant frequency, and hence, the accuracy of the measurement because the sound propogation varies with the temperature of the propagating medium. Compensation for variations in the temperature of the transducer air column can be accomplished by dial "slippage" in the same manner as described above with regard to compensation for changes in liquid temperature. In practice it has been found that it is not necessary to compensate for the air column temperature in order to obtain the desired degree of accuracy as long as the dial reading is compensated for the temperature of the liquid within the tank.

Although the embodiment shown in FIG. 3 uses a permanent tube installation and a portable instrument containing the necessary oscillator, amplifier and readout equipment, it is obvious that a remote control system can accomplish the same thing by switching in the appropriate set of electrical signal lines from each tank to a central console where the measurement can be made and recorded.

The embodiment shown in FIG. 4 is designed for use with shipboard tanks and other nonstationary installations. The accurate measurement of liquid levels in a ship's fuel and fresh water storage compartments is difficult at best with a zero sea state and almost impossible under adverse sea conditions because the liquid levels are constantly shifting as the liquid sloshes around in the storage compartments. At present the liquid levels are checked by using a dip stick to determine the level in the compartment. If the sea is rough, a number of individual readings must be obtained and then averaged to produce even a fairly accurate indication of liquid level.

The liquid level measuring apparatus shown in FIGS. 2 and 3 can be easily modified to overcome the problems associated with shipboard measurement of liquid levels. Theoretically, if the entire empty portion of the tank could be resonated, the resonate frequency would provide an accurate measure of liquid level regardless of how violently the liquid was sloshing around within the tank because the liquid volume, and hence, the acoustic volume would remain constant. As a practical matter this is not feasible because of the extremely low resonate frequency of such an installation. However, if a simultaneous reading of liquid level is made in two sections of the tank and averaged simultaneously, the effects of liquid sloshing can be rendered insignificant from a measurement viewpoint.

The embodiment shown in FIG. 4 accomplishes this simultaneity of measurement and averaging by utilizing a dual communicating acoustic probe indicated generally as 88. The probe 88 has a generally Y shaped configuration with downwardly disposed extensions 90 and 92 and common communicating passageway 94. Probe extensions 90 and 92 are immersed in liquid 4 at spaced positions within storage compartment 96 and form acoustic cavities 98 and 100. Acoustic cavities 98 and 100 are coupled to a single acoustic transducer 102 by means of the common communicating passageway 94. When transducer 102 is energized by a signal having the proper frequency, both cavities are simultaneously resonated and each cavity produces an acoustical loading on the transducer 102 since the total acoustical loading in transducer 102 is the sum of the individual loadings produced by the resonance of each cavity, the output of transducer 102 represents an average reading of the two cavities. The resonate frequency of the dual acoustic probe 88 will vary with changes in liquid level whether the changes are caused by the addition or withdrawal of liquid from the tank or merely by liquid sloshing. The liquid level may vary between probe extensions 90 and 92 if the ship has a relatively constant heel. However, since the extensions 90 and 92 are in direct communication with the acoustic transducer 102, a heel induced increase in liquid level in one arm is offset by a corresponding decrease in the liquid level in the other arm so that the acoustic cavity size, and hence, the resonate frequency of the entire probe 88 remains constant.

In the case of liquid level changes caused by liquid sloshing, the changes are transient changes which are impressed upon the fundamental liquid level. The transient changes can be effectively eliminated by simultaneously measuring and averaging the liquid levels in both extensions of the dual communicating acoustic probe 88. As mentioned above, this is automatically accomplished by the common communicating passageway 94 and single transducer 102. Detection of the probe's resonance can be determined by any of the methods described previously with regard to the embodiments shown in FIGS. 2 and 3. Temperature compensation of the averaged reading can also be achieved in a similar manner.

The shipboard measurement situation is ideally suited for the portable type of installation shown in FIG. 3. A dual communicating acoustic probe 88, acoustic transducer 102 and temperature probe 104 can be permanently installed in each compartment with all of the necessary electrical leads being brought out of the compartment and terminated in a suitable junction box 106. A portable instrument 76 containing the audio oscillator, amplifier and associated circuitry can then be carried from junction box to junction box to determine the liquid level in each particular storage compartment.

The embodiment shown in the drawings are by way of illustration only since it is obvious that once the combination of acoustic resonance and its electrical transduction as a means for measuring liquid level are demonstrated, many alternatives regarding measurement details will become evident to those skilled in the art.

I claim:

1. An apparatus for determining the level of a liquid in a container comprising: means for forming a columnar acoustic cavity over the liquid; means for acoustically resonating said cavity; and means for ascertaining the resonance of said cavity, said resonance being a measure of the size of said cavity and varying in accordance with changes in liquid level within said cavity and container whereby the liquid level within the container can be determined from the resonance of said cavity.

2. An apparatus for determining the level of the liquid in a container comprising: means for forming a columnar acoustic cavity over the liquid; means for acoustically resonating said cavity; transducer means responsive to the resonance of said cavity for converting acoustical resonance into an electrical signal having a characteristic which varies in accordance with changes in the liquid level within said cavity and container; and means responsive to said electrical signal for indicating the level of the liquid in said container.

3. An apparatus for determining the level of a liquid in a container comprising: an open-ended tube having one end thereof in fluid communication with the liquid, said tube and liquid forming a variable acoustic cavity within said tube; gaseous blower means for acoustically resonating said cavity; transducer means responsive to the resonance of said cavity for converting acoustical resonance into an electrical signal having a characteristic which varies in accordance with changes in the liquid level within said tube and container; and means responsive to said electrical signal for indicating the level of the liquid in said container.

4. An apparatus for determining the level of a liquid in a container comprising: an open-ended tube having one end thereof in fluid communication with the liquid, said tube and liquid forming a variable acoustic cavity within said tube; gaseous blower means for acoustically resonating said cavity; a microphone responsive to the resonance of said cavity for converting acoustical resonance into an electrical signal having a frequency which varies in accordance with changes in the liquid level within said tube and container; an audio amplifier coupled to said microphone; and frequency measuring means coupled to said amplifier for determining the resonant frequency of said cavity, said frequency measuring means being calibrated to read in terms of liquid level whereby the level of the liquid can be read directly from said frequency measuring means.

5. An apparatus for determining the level of the liquid in a container comprising: an open-ended tube having one end thereof in fluid communication with the liquid, said tube and liquid forming a variable columnar acoustic cavity within said tube; a mechanically damped loudspeaker acoustically coupled to said tube at the other end thereof; an audio amplifier coupled to said loudspeaker, said amplifier being driven by a variable frequency audio oscillator calibrated in terms of liquid level; and electrical means for detecting the resonant acoustic cavity loading on said loudspeaker whereby the liquid level in the container can be read directly from the audio oscillator.

6. An appartus for determining the level of a liquid in a container comprising: an open-ended tube having one end thereof in fluid communication with the liquid, said tube and liquid forming a variable columnar acoustic cavity within said tube; a mechanically damped loudspeaker acoustically coupled to said tube at the other end thereof; and audio amplifier coupled to said loudspeaker, said amplifier being driven by a variable frequency audio oscillator calibrated in terms of liquid level; and electrical means for detecting the resonant acoustic cavity loading on said loudspeaker produced by a harmonic frequency of the fundamental resonant frequency of said cavity, said harmonic resonance being sharper than the fundamental resonance whereby the liquid level in the container can be read with increased resolution directly from the audio oscillator.

7. An appartus for determining the level of the liquid in a container comprising: means for forming a columnar acoustic cavity over the liquid, said cavity having an acoustic fluid therein; means for acoustically resonating said cavity; transducer means responsive to the resonance of said cavity for converting acoustical resonance into an electrical signal having a characteristic which varies in accordance with changes in the liquid level within said cavity and container; means responsive to said electrical signal for indicating the level of the liquid in said container; means for determining the temperature of the acoustic fluid within said acoustic cavity; and means for compensating said indicating means in accordance with the temperature of said acoustic fluid.

8. An apparatus for determining the liquid content of a container comprising: means for forming a columnar acoustic cavity over the liquid, said cavity having an acoustic fluid therein; means for acoustically resonating said cavity; transducer means responsive to the resonance of said cavity for converting acoustical resonance into an electrical signal having a characteristic which varies in accordance with changes in the liquid level within said cavity and container; means responsive to said electrical signal for indicating the liquid content of said container; means for determining the temperature of the liquid in said container; and means for compensating said indicating means in accordance with the temperature of said liquid in said container.

9. An apparatus for determining the level of the liquid in a container comprising: an open-ended tube having one end thereof in fluid communication with the liquid, said tube and liquid forming a variable columnar acoustic cavity within said tube; an acoustic fluid within said cavity; a mechanically damped loudspeaker acoustically coupled to said tube at the other end thereof; an audio amplifier coupled to said loudspeaker, said amplifier being driven by a variable frequency audio oscillator having a dial calibrated in terms of liquid level, means for determining the temperature of said acoustic fluid; a temperature scale mounted on said audio oscillator coaxially with said dial; a movable cursor pivotally mounted on the axis of said dial and temperature scale; and electrical means for detecting the resonant acoustical loading of said loudspeaker whereby the temperature compensated liquid level in the container can be read directly from said dial after adjustment of said movable cursor.

10. An apparatus for determining the liquid content of a container comprising: an open-ended tube having one end thereof in fluid communication with the liquid, said tube and liquid forming a variable columnar acoustic cavity within said tube; a mechanically damped loudspeaker acoustically coupled to said tube at the other end thereof; an audio amplifier coupled to said loudspeaker, said amplifier being driven by a variable frequency audio oscillator having a dial calibrated in terms of liquid content; means for determining the temperature of the liquid; a temperature scale mounted on said audio oscillator coaxially with said dial; a movable cursor pivotally mounted on the axis of said dial and temperature scale; and electrical means for detecting the resonant acoustic cavity loading on said loudspeaker whereby the temperature compensated liquid content of said container can be read directly from said dial after adjustment of said movable cursor.

11. An apparatus for determining the level of a liquid in a moving container comprising: a dual communicating acoustic probe comprising a common communicating passageway, a first and second probe extension connected to said passageway, said extensions being in fluid communication with said liquid and forming, respectively, first and second variable columnar acoustic cavities; means for simultaneously resonating said cavities; and means responsive to the combined resonances of said cavities for indicating the liquid level in said moving container.

12. A method for determining the level of a liquid in a container comprising the steps of: forming a columnar acoustic cavity over the surface of the liquid; acoustically resonating said cavity; detecting the resonance of said cavity; and converting said resonance into a reading of liquid level in the container.

13. A method for determining the level of a liquid in a container comprising the steps of: forming a columnar acoustic cavity over the surface of the liquid; acoustically resonating said cavity; determining the fundamental resonant frequency of said cavity; and converting said frequency into a reading of liquid level in the container.

14. A method for determining the level of a liquid in a container comprising the steps of: forming a columnar acoustic cavity over the surface of the liquid; acoustically resonating said cavity at its fundamental resonant frequency; determining the fundamental resonant frequency of said cavity; converting said fundamental frequency into a reading of approximate liquid level in the container; acoustically resonating said cavity at a harmonic of said fundamental resonant frequency; determining the frequency of said harmonic; and converting said harmonic frequency into a precise reading of liquid level in said container.

15. A method for determining the level of a liquid in a container comprising the steps of: forming a columnar acoustic cavity having an acoustic fluid therein over the surface of the liquid; acoustically resonating said cavity; detecting the resonance of said cavity; converting said resonance into a reading of liquid level in the container; measuring the temperature of said acoustic fluid; and compensating said liquid level reading in accordance with the temperature of said acoustic fluid.

16. A method for determining the liquid content of a container comprising the steps of: forming a columnar acoustic cavity over the surface of the liquid; acoustically resonating said cavity; detecting the resonance of said cavity; converting said resonance into a reading of liquid content in the container; measuring the temperature of said liquid; and compensating said liquid content reading in accordance with the temperature of said liquid.

17. A method for determining the level of a liquid in a container comprising the steps of: forming a columnar acoustic cavity having an acoustic fluid therein over the surface of the liquid; acoustically resonating said cavity; converting said resonance into a reading of liquid level in the container; measuring the temperature of said acoustic fluid; measuring the temperature of said liquid; and compensating said liquid level reading in accordance with the temperature of said liquid and acoustic fluid.

18. A method for determining the level of a liquid in a moving container comprising the steps of: forming two columnar acoustic cavities over the surface of the liquid; acoustically resonating said cavities simultaneously; detecting the combined resonances of said cavities; and converting said combined resonances into a reading of liquid level in said moving container.

References Cited by the Examiner

UNITED STATES PATENTS

| | | | |
|---|---|---|---|
| 1,590,287 | 6/1926 | De Giers | 73—311 |
| 2,584,128 | 2/1952 | Hildyard | 73—290 X |
| 2,716,341 | 8/1955 | Ilfrey et al. | 73—290.5 |
| 2,927,301 | 3/1960 | Booth et al. | 73—290 X |

FOREIGN PATENTS 748,729   12/1943   Germany.

ISAAC LISANN, *Primary Examiner.*

FRANK H. THOMSON, *Assistant Examiner.*